(12) United States Patent
Kubomi et al.

(10) Patent No.: US 11,956,146 B2
(45) Date of Patent: Apr. 9, 2024

(54) CONTROLLER, NETWORK SYSTEM, AND FLOW MANAGEMENT METHOD

(71) Applicant: Mitsubishi Electric Corporation, Tokyo (JP)

(72) Inventors: Makoto Kubomi, Tokyo (JP); Ryuma Matsushita, Tokyo (JP); Daisuke Takita, Tokyo (JP); Yoshifumi Hotta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/869,479

(22) Filed: Jul. 20, 2022

(65) Prior Publication Data

US 2022/0360524 A1 Nov. 10, 2022

Related U.S. Application Data

(63) Continuation of application No. PCT/JP2020/010386, filed on Mar. 10, 2020.

(51) Int. Cl.
*H04L 45/02* (2022.01)
*H04L 45/00* (2022.01)
*H04L 45/42* (2022.01)

(52) U.S. Cl.
CPC .............. *H04L 45/38* (2013.01); *H04L 45/02* (2013.01); *H04L 45/42* (2013.01)

(58) Field of Classification Search
CPC .......... H04L 45/38; H04L 45/02; H04L 45/42
(Continued)

(56) References Cited

U.S. PATENT DOCUMENTS

| | | | |
|---|---|---|---|
| 8,792,374 B1 * | 7/2014 | Jain | H04L 45/42 370/252 |
| 11,088,937 B1 * | 8/2021 | Zhou | H04L 45/26 |

(Continued)

FOREIGN PATENT DOCUMENTS

| | | |
|---|---|---|
| CN | 105743794 A | 7/2016 |
| EP | 2 658 176 B2 | 6/2017 |

(Continued)

OTHER PUBLICATIONS

Office Action dated Oct. 21, 2022 in corresponding Indian Application No. 202247040205.
(Continued)

*Primary Examiner* — Anthony Mejia
(74) *Attorney, Agent, or Firm* — BIRCH, STEWART, KOLASCH & BIRCH, LLP

(57) ABSTRACT

A reception unit (210) receives an addition requesting frame for requesting addition of a new flow. A first search unit (241) performs, using a network-information database (280), a first search for searching for a schedule and a path assignable to the new flow without the schedule and the path of each existing flow being changed, when the addition requesting frame is received. A second search unit (242) performs a second search for changing the schedule and the path of each existing flow and searching for the schedule and the path assignable to the new flow, using the network-information database, when the schedule and the path assignable to the new flow have not been found by the first search. A response unit (260) transmits an addition responding frame.

5 Claims, 17 Drawing Sheets

281:FLOW TABLE

| SWITCH | FLOW PATTERN | ACTION | FLAG | COUNTER |
|---|---|---|---|---|
| SWITCH (A) | DESTINATION IP ADDRESS=xxx | FORWARDING FROM PORT (2) | 0 | 0 |
| | DESTINATION MAC ADDRESS=yyy | REPRODUCTIVELY FORWARDING FROM PORTS (1) AND (2) | 1 | 0 |
| SWITCH (B) | TRANSMISSION-ORIGIN MAC ADDRESS=zzz | NOT FORWARDING | 0 | 0 |
| | DESTINATION IP ADDRESS=xxx | FORWARDING FROM PORT (3) | 0 | 0 |
| : | : | : | : | : |

(58) Field of Classification Search
USPC .......................................................... 709/238
See application file for complete search history.

(56) References Cited

U.S. PATENT DOCUMENTS

| | | | | |
|---|---|---|---|---|
| 11,165,692 | B2* | 11/2021 | Singh | ...................... H04L 45/54 |
| 11,277,331 | B2* | 3/2022 | Rolando | ................. H04L 67/51 |
| 2001/0025321 | A1* | 9/2001 | Tang | ........................ H04L 45/00 |
| | | | | 709/246 |
| 2013/0163602 | A1 | 6/2013 | Kang et al. | |
| 2014/0241367 | A1 | 8/2014 | Ichino | |
| 2015/0236919 | A1 | 8/2015 | Suzuki et al. | |
| 2015/0281077 | A1 | 10/2015 | Yamashita et al. | |
| 2015/0326477 | A1 | 11/2015 | Fujita et al. | |
| 2016/0006675 | A1 | 1/2016 | Takase et al. | |
| 2016/0191194 | A1* | 6/2016 | Wood | .................. H04J 14/0267 |
| | | | | 398/58 |
| 2016/0191370 | A1 | 6/2016 | Wood | |
| 2016/0191391 | A1 | 6/2016 | Wood et al. | |
| 2017/0091258 | A1* | 3/2017 | Rajahalme | ............ H04L 45/023 |
| 2018/0077006 | A1* | 3/2018 | Cui | ......................... H04L 41/40 |
| 2019/0140956 | A1* | 5/2019 | Shen | ................... H04L 45/7453 |
| 2021/0083970 | A1* | 3/2021 | Liu | ....................... H04L 69/167 |
| 2022/0210015 | A1* | 6/2022 | Barritt | .................... H04L 41/12 |

FOREIGN PATENT DOCUMENTS

| | | |
|---|---|---|
| JP | 2014-154912 A | 8/2014 |
| JP | 2015-507377 A | 3/2015 |
| JP | 2015-186213 A | 10/2015 |
| JP | 2015-530767 A | 10/2015 |
| JP | 2016-15556 A | 1/2016 |
| WO | WO 2014/098114 A1 | 6/2014 |

OTHER PUBLICATIONS

Alnajim Abdullah et al. "Incremental Path-Selection and Scheduling for Time-Sensitive Networks", 2019 IEEE Global Communications Conference, Dec. 9, 2019, pp. 1-6.

Delaet Sylvie, et al. "Make & Activate-Before-Break for Seamless SDN Route Updates" Computer Networks, vol. 147, Dec. 31, 2018, pp. 81-97.

Extended European Search Report dated Dec. 23, 2022 issued in corresponding European Application No. 20924549.7.

International Search Report for PCT/JP2020/010386 dated Jul. 21, 2020.

Nayak et al., "Incremental Flow Scheduling and Routing in Time-Sensitive Software-Defined Networks", IEEE Transactions on Industrial Informatics, May 2018, vol. 14, No. 5, pp. 2066-2075.

Written Opinion of the International Searching Authority for PCT/JP2020/010386 (PCT/ISA/237) dated Jul. 21, 2020.

Chinese Office Action and Search Report for Chinese Application No. 202080098016.4, dated Oct. 11, 2023, with an English translation.

* cited by examiner

Fig. 5

281: FLOW TABLE

| SWITCH | FLOW PATTERN | ACTION | FLAG | COUNTER |
|---|---|---|---|---|
| SWITCH (A) | DESTINATION IP ADDRESS=xxx | FORWARDING FROM PORT (2) | 0 | 0 |
| | DESTINATION MAC ADDRESS=yyy | REPRODUCTIVELY FORWARDING FROM PORTS (1) AND (2) | 1 | 0 |
| | TRANSMISSION-ORIGIN MAC ADDRESS=zzz | NOT FORWARDING | 0 | 0 |
| SWITCH (B) | DESTINATION IP ADDRESS=xxx | FORWARDING FROM PORT (3) | 0 | 0 |
| .. | .. | .. | .. | .. |

Fig. 6

283i: FLOW INFORMATION

| PRIORITY DEGREE | ACCEPTABLE DELAY [ms] | TRANSMISSION CYCLE [ms] | FRAME LENGTH [byte] | NUMBER OF FRAMES | GAP BETWEEN FRAMES [byte] | PATH INFORMATION | | USED-SLOT INFORMATION | |
|---|---|---|---|---|---|---|---|---|---|
| | | | | | | EN-ROUTE DEVICE | FORWARDING PORT | START TIME POINT [μs] | END TIME POINT [μs] |
| 6 | 10 | 20 | 290 | 2 | 12 | TRANSMISSION: NODE (2) | PORT (1) | 100 | 150 |
| | | | | | | FORWARDING: SWITCH A | PORT (1) | 200 | 250 |
| | | | | | | RECEPTION: NODE (3) | — | — | — |

Fig. 7

284i: TIME-SLOT INFORMATION

| CYCLE TIME [μs] | GATE CONTROL LIST | | VACANT-SLOT INFORMATION | |
|---|---|---|---|---|
| | GATE STATE | CONTINUING TIME [μs] | START TIME POINT [μs] | END TIME POINT [μs] |
| 500 | 0x80 | 200 | 0 | 200 |
| | 0x40 | 300 | 250 | 500 |

CONTROLLER, NETWORK SYSTEM, AND FLOW MANAGEMENT METHOD

CROSS REFERENCE TO RELATED APPLICATIONS

This application is a Continuation of PCT International Application No. PCT/JP2020/010386, filed on Mar. 10, 2020, all of which is hereby expressly incorporated by reference into the present application.

TECHNICAL FIELD

The present disclosure relates to a method for managing a communication flow.

BACKGROUND ART

A network called a TSSDN exists.

The TSSDN is a network which can centrally manage setting information of TSN switches by a controller and easily reflect the setting information in network devices.

TSSDN stands for Time-Sensitive Software-Defined Network.

TSN stands for Time-Sensitive Networking.

Non-Patent Literature 1 discloses a technique regarding the TSSDN as below.

In the TSSDN, when addition of a new communication flow is requested, a conventional controller enables the addition of the new communication flow in a following manner.

The conventional controller calculates a schedule and a path for adding the new communication flow based on information on the new communication flow and stored schedule information under a condition that a path of an existing communication flow is not changed.

CITATION LIST

Non-Patent Literature

Non-Patent Literature 1: N. G. Nayak, F. Durr, and K. Rothermel, "Incremental Flow Scheduling and Routing in Time-Sensitive Software-Defined Networks", IEEE Transactions on Industrial Informatics, May, 2018, vol. 14, no. 5, pp. 2066-2075

SUMMARY OF INVENTION

Technical Problem

In the disclosure of Non-Patent Literature 1, the conventional controller has a problem as below.

In a situation that the new communication flow can be added if the existing communication flow is changed, the conventional controller cannot add the new communication flow.

The present disclosure aims to enable adding a new communication flow in a situation that the new communication flow can be added if an existing communication flow is changed.

Solution to Problem

A controller according to the present disclosure includes:
a reception unit to receive an addition requesting frame for requesting addition of a new flow which is a new communication flow;
a first search unit to perform, using a network-information database in which a schedule and a path of each existing flow which is an existing communication flow are registered, a first search for searching for a schedule and a path assignable to the new flow without the schedule and the path of each existing flow being changed, when the addition requesting frame is received;
a second search unit to perform a second search for changing the schedule and the path of each existing flow and searching for the schedule and the path assignable to the new flow, using the network-information database, when the schedule and the path assignable to the new flow have not been found by the first search; and
a response unit to transmit an addition responding frame for responding to the addition requesting frame.

Advantageous Effects of Invention

According to the present disclosure, it is possible to add a new communication flow in a situation that the new communication flow can be added if an existing communication flow is changed.

BRIEF DESCRIPTION OF DRAWINGS

FIG. 5 is a configuration diagram of a flow table 281 according to the first embodiment.

FIG. 6 is a configuration diagram of flow information 283$i$ according to the first embodiment.

FIG. 7 is a configuration diagram of time-slot information 284$i$ according to the first embodiment.

DESCRIPTION OF EMBODIMENTS

Figure 1:
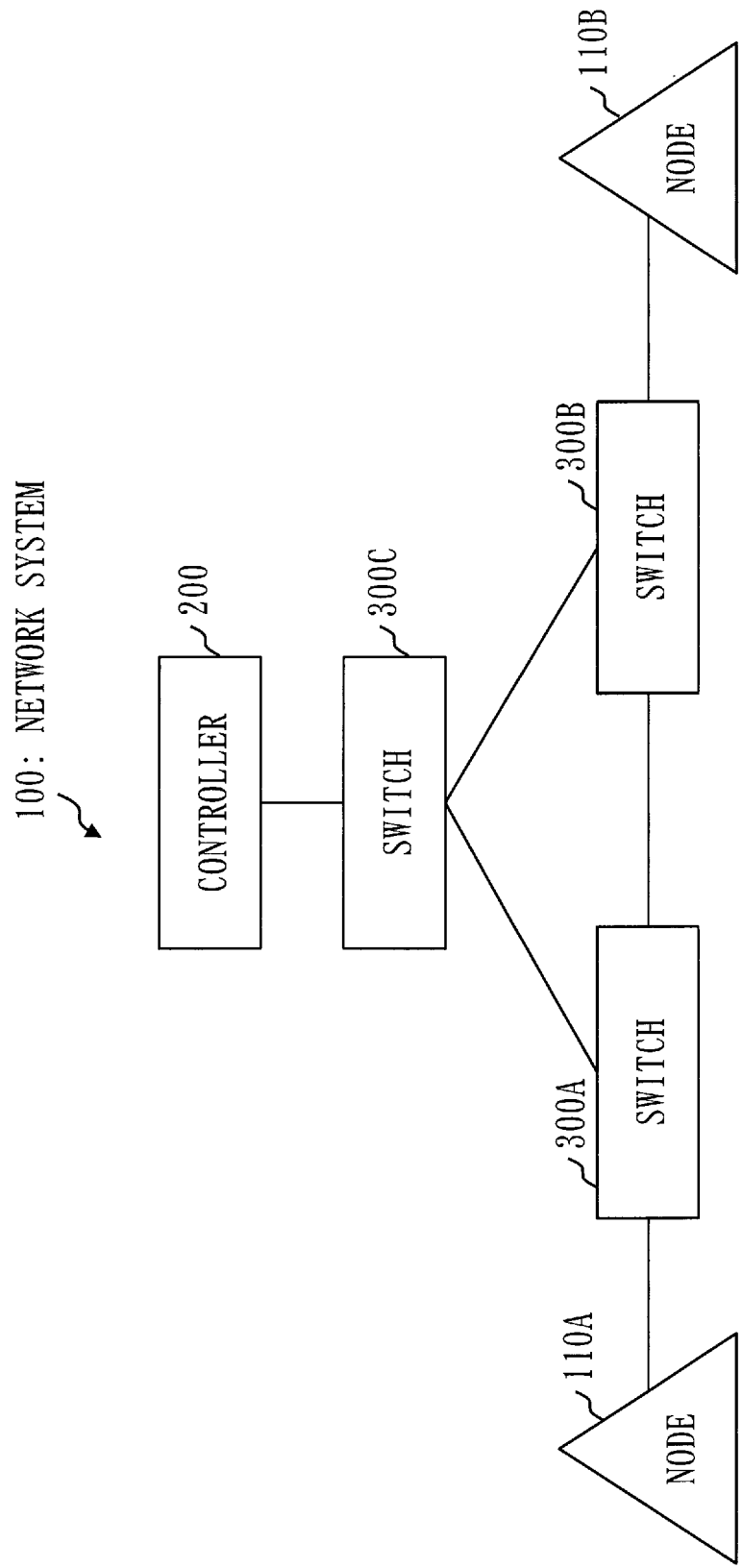
FIG. 1 is a configuration diagram of a network system 100 according to a first embodiment.

In the embodiments and the drawings, the same reference numerals are assigned to the same elements or corresponding elements. Descriptions of elements assigned the same reference numerals as the described elements will be omitted or simplified as necessary. Arrows in the drawings mainly indicate flows of data or flows of processes.

First Embodiment

A network system 100 will be described based on FIGS. 1 to 17.

The network system 100 is, for example, a system to which an SDN is applied.

SDN stands for Software-Defined Network.

Description of Configuration

A configuration of the network system 100 will be described based on FIG. 1.

The network system 100 includes a controller 200, a plurality of switches 300, and a plurality of nodes 110.

FIG. 1 illustrates three switches (300A to 300C) as examples of the plurality of switches 300. Further, FIG. 1 illustrates two nodes (110A and 110B) as examples of the plurality of nodes 110.

The node 110 is a device which transmits and receives various types of frames. The frame is also referred to as an Ethernet frame or a communication frame. Ethernet is a registered trademark.

The switch 300 is a device which forwards the frame.

The controller 200 is a device which manages a communication flow.

The communication flow means a flow of the frame in communication.

Figure 2:
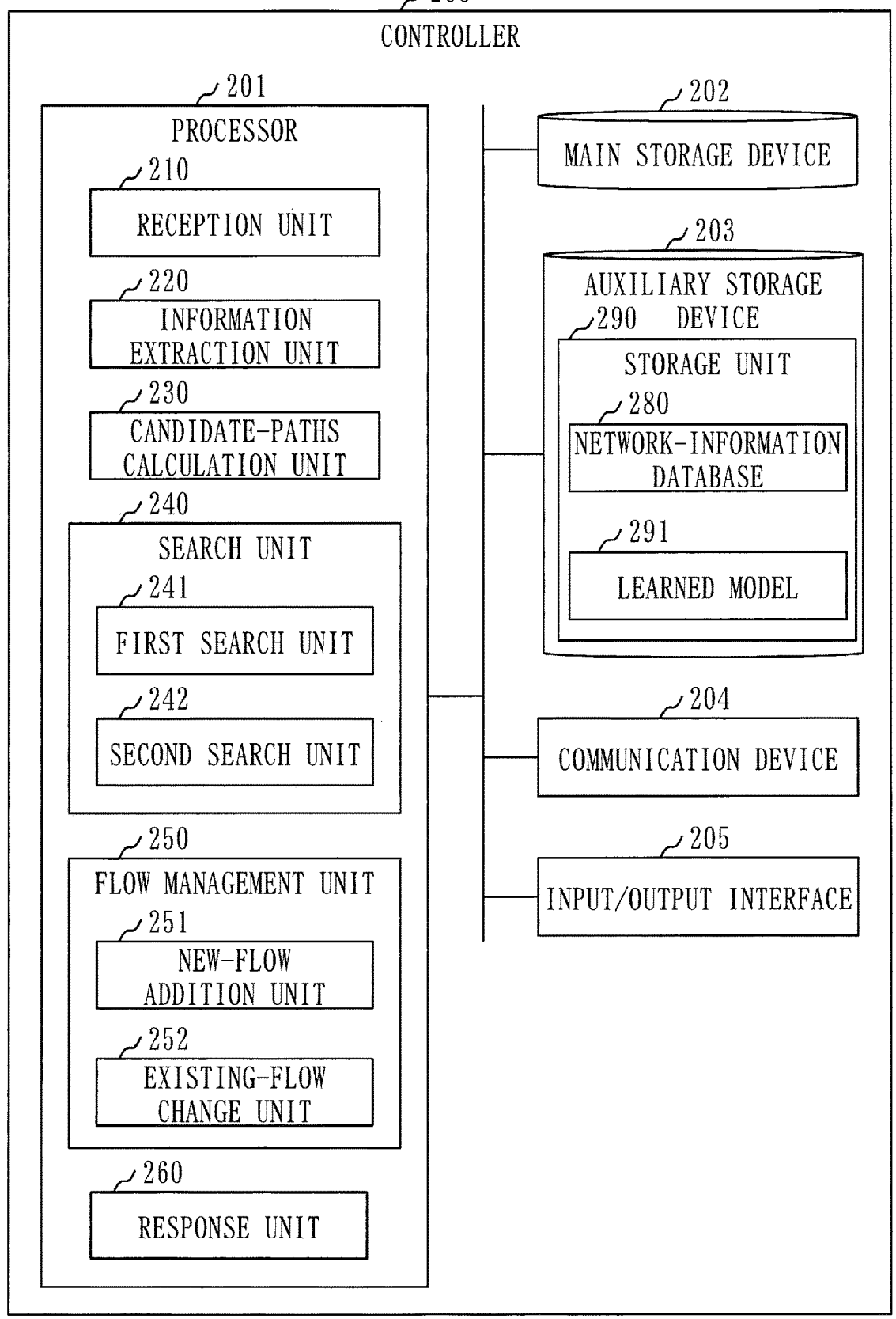
FIG. 2 is a configuration diagram of a controller 200 according to the first embodiment.

Based on FIG. 2, a configuration of the controller 200 will be described.

The controller 200 is a computer which includes pieces of hardware such as a processor 201, a main storage device 202, an auxiliary storage device 203, a communication device 204, and an input/output interface 205. These pieces of hardware are connected to each other via a signal line.

The processor 201 is an IC that performs a computation process, and controls other pieces of hardware. For example, the processor 201 is a CPU.

IC stands for Integrated Circuit.

CPU stands for Central Processing Unit.

The main storage device 202 is a volatile or non-volatile storage device. The main storage device 202 is also referred to as a memory or a main memory. For example, the main storage device 202 is a RAM. Data stored in the main storage device 202 is stored in the auxiliary storage device 203 as necessary.

RAM stands for Random Access Memory.

The auxiliary storage device 203 is a non-volatile storage device. For example, the auxiliary storage device 203 is a ROM, an HDD, or a Flash Memory. Data stored in the auxiliary storage device 203 is loaded into the main storage device 202 as necessary.

ROM stands for Read Only Memory.

HDD stands for Hard Disk Drive.

The communication devices 204 are a receiver and a transmitter. For example, the communication device 204 is a communication chip or an NIC.

NIC stands for Network Interface Card.

The input/output interface 205 is a port to which an input device and an output device are connected.

The controller 200 includes elements such as a reception unit 210, an information extraction unit 220, a candidate-paths calculation unit 230, a search unit 240, a flow management unit 250, and a response unit 260. The search unit 240 includes elements such as a first search unit 241 and a second search unit 242. The flow management unit 250 includes elements such as a new-flow addition unit 251 and an existing-flow change unit 252. These elements are realized by software.

The auxiliary storage device 203 stores a flow management program for causing a computer to function as the reception unit 210, the information extraction unit 220, the candidate-paths calculation unit 230, the search unit 240, the flow management unit 250, and the response unit 260. The flow management program is loaded into the main storage device 202 and executed by the processor 201.

The auxiliary storage device 203 further stores an OS. At least a part of the OS is loaded into the main storage device 202 and executed by the processor 201.

The processor 201 executes the flow management program while executing the OS.

OS stands for Operating System.

Input/output data of the flow management program is stored in a storage unit 290. For example, the storage unit 290 stores a network-information database 280, a learned model 291, and the like The auxiliary storage device 203 functions as the storage unit 290. However, storage devices such as the main storage device 202, a register in the processor 201, and a cash memory in the processor 201 may function as the storage unit 290 in place of the auxiliary storage device 203 or together with the auxiliary storage device 203.

The controller 200 may include a plurality of processors which substitute for the processor 201. The plurality of processors share functions of the processor 201.

The flow management program can be recorded (stored) in a non-volatile recording medium such as an optical disc or a flash memory, in a computer-readable manner.

Figure 3:
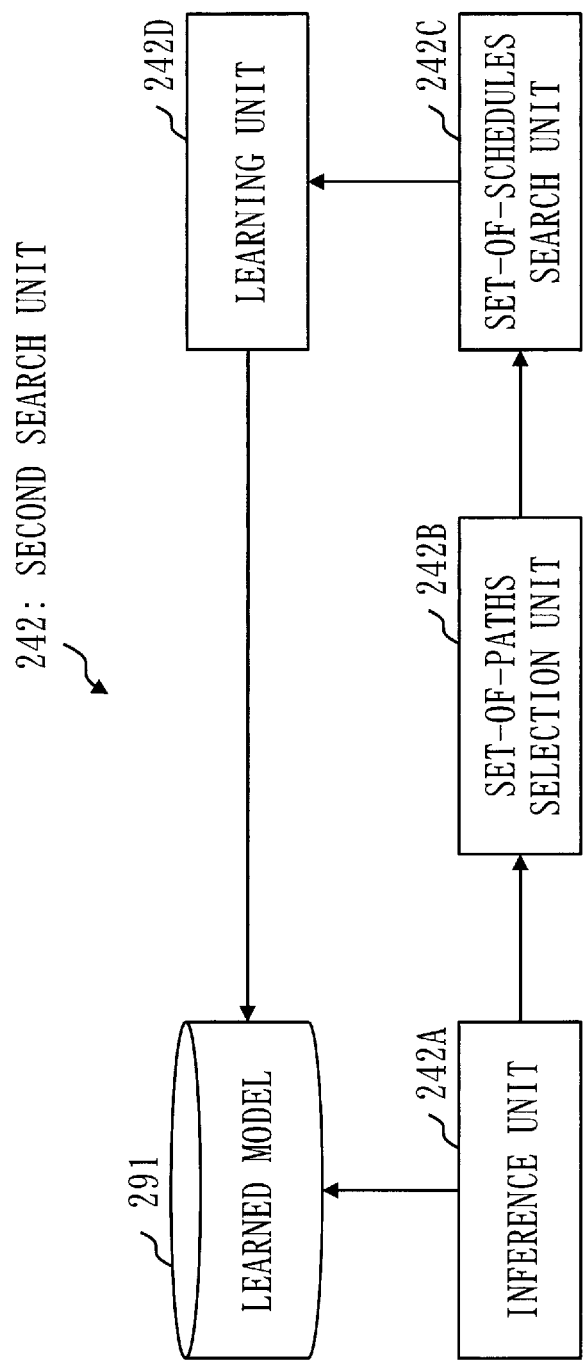
FIG. 3 is a configuration diagram of a second search unit 242 according to the first embodiment.

Based on FIG. 3, a configuration of the second search unit 242 will be described.

The second search unit 242 includes elements such as an inference unit 242A, a set-of-paths selection unit 242B, a set-of-schedules search unit 242C, and a learning unit 242D. Functions of these elements will be described later.

Figure 4:
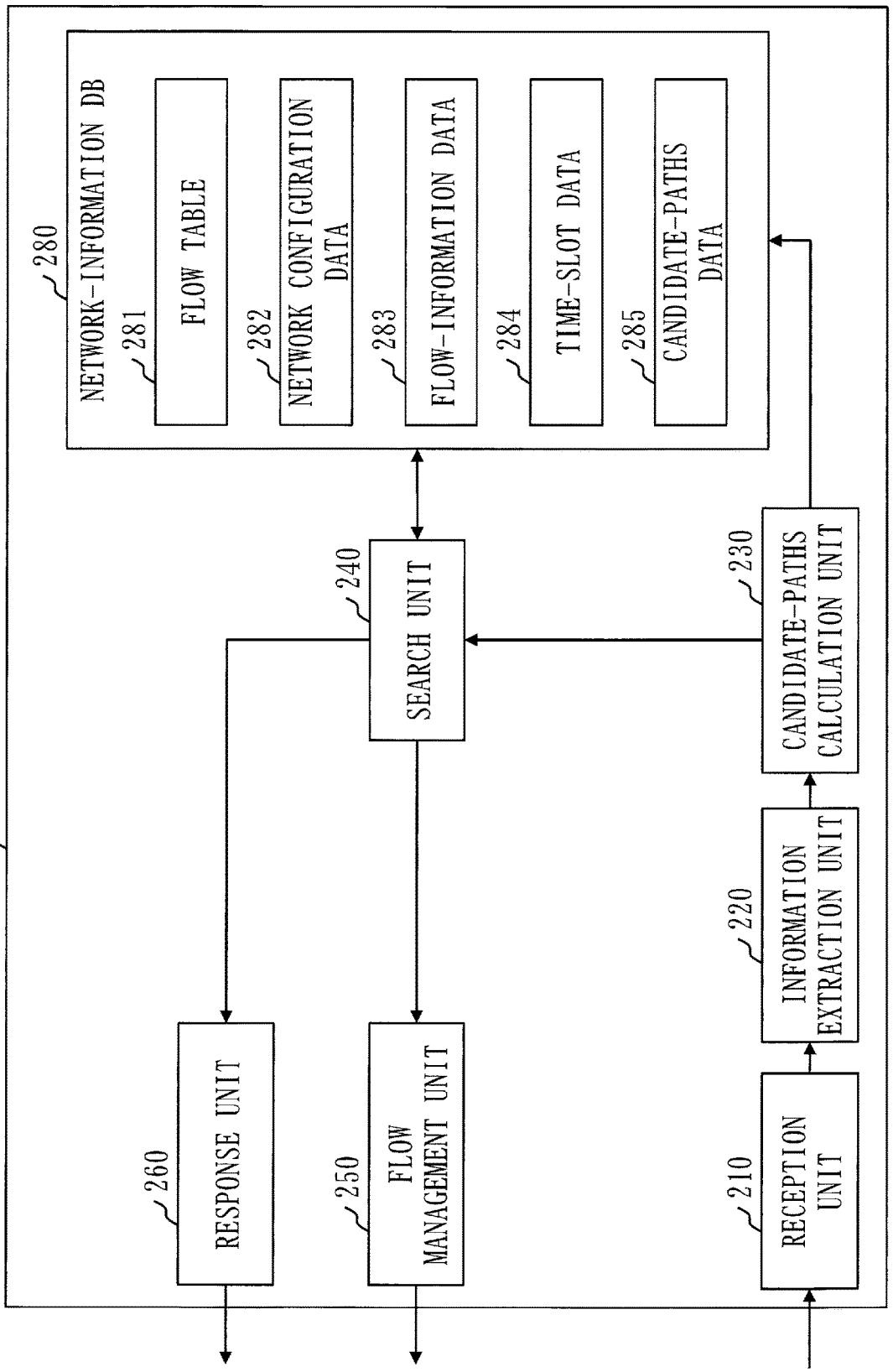
FIG. 4 is a functional block diagram of the controller 200 according to the first embodiment.

Based on FIG. 4, a configuration of the network-information database 280 will be described.

The network-information database 280 includes a flow table 281, network configuration data 282, flow-information data 283, time-slot data 284, and candidate-paths data 285.

Based on FIG. 5, the flow table 281 will be described.

The flow table 281 has one or more flow entries for each switch 300.

The flow entry includes pieces of information such as a flow pattern, an action, a flag, and a counter.

The flow pattern is a pattern of the communication flow. The communication flow is categorized for each flow pattern. For example, the flow pattern indicates a destination IP address, a destination MAC address, a transmission-origin IP address, a transmission-origin MAC address, or the like, which is set in the frame.

The action indicates operation of the switch 300. Specifically, the action indicates a forwarding method of the frame corresponding to the flow pattern. "Reproductively forwarding" means reproducing and forwarding the frame according to a path redundancy method stipulated in IEEE 802.1CB. "Not forwarding" means discarding the frame.

The flag indicates whether or not the flow entry has been prepared for a specific standard. The specific standard is IEEE 802.1CB. "1" means that the flow entry has been prepared for the specific standard.

The counter indicates the number of times that the action has been executed.

The network configuration data 282 will be described.

The network configuration data 282 is data indicating a configuration of the network system 100.

The network configuration data 282 indicates pieces of information such as connection information, cable length, link speed, and a forwarding delay.

The connection information indicates a set of devices physically connected.

The cable length indicates length of a cable between the devices. The cable is also referred to as a communication cable.

The link speed is speed of communication between the devices.

The forwarding delay is delay time at a time of forwarding at each switch 300.

Based on FIG. 6, the flow-information data 283 will be described.

The flow-information data 283 indicates flow information 283i for each communication flow.

The flow information 283i includes pieces of information such as a priority degree, an acceptable delay, a transmission cycle, frame length, the number of frames, a gap between frames, path information, and used-slot information.

The priority degree is a value for deciding order of priority of the communication flow.

The acceptable delay is acceptable communication time.

The transmission cycle is a cycle in which the frame is transmitted.

The frame length is a size of the frame.

The number of frames is the number of frames transmitted within the transmission cycle.

The gap between the frames is a time interval between the frames.

The path information indicates a device (an en-route device) through which the frame passes, and a port (a forwarding port) which transmits the frame at the en-route device. The en-route device is a device which transmits, forwards, or receives the frame.

The used-slot information indicates a time range (an assigned time range) which has been assigned to the communication flow. Specifically, the used-slot information indicates a time point (a start time point) when forwarding (or transmitting) of the frame starts at the en-route device and a time point (an end time point) when the forwarding (or the transmitting) of the frame ends at the en-route device.

A path of the communication flow is decided according to the path information. The path of the communication flow means a communication route of the frame in the communication flow. The path is also referred to as a "route".

A schedule of the communication flow is decided according to the used-slot information.

Based on FIG. 7, the time-slot data 284 will be described.

The time-slot data 284 indicates time-slot information 284i for each communication port of each switch 300.

The time-slot information 284i includes pieces of information such as cycle time, a gate control list, and vacant-slot information.

The cycle time is length of time managed.

The gate control list is information for Scheduled traffic stipulated in IEEE 802.1Q-2018 and indicates a set of a gate state and continuing time.

The vacant-slot information indicates a time range (vacant time range) which is vacant in the cycle time. The vacant time range is specified by a set of the start time point and the end time point.

The candidate-paths data 285 will be described.

The candidate-paths data 285 includes pieces of information on candidate paths of each communication flow.

The candidate paths will be described later.

Figure 8:
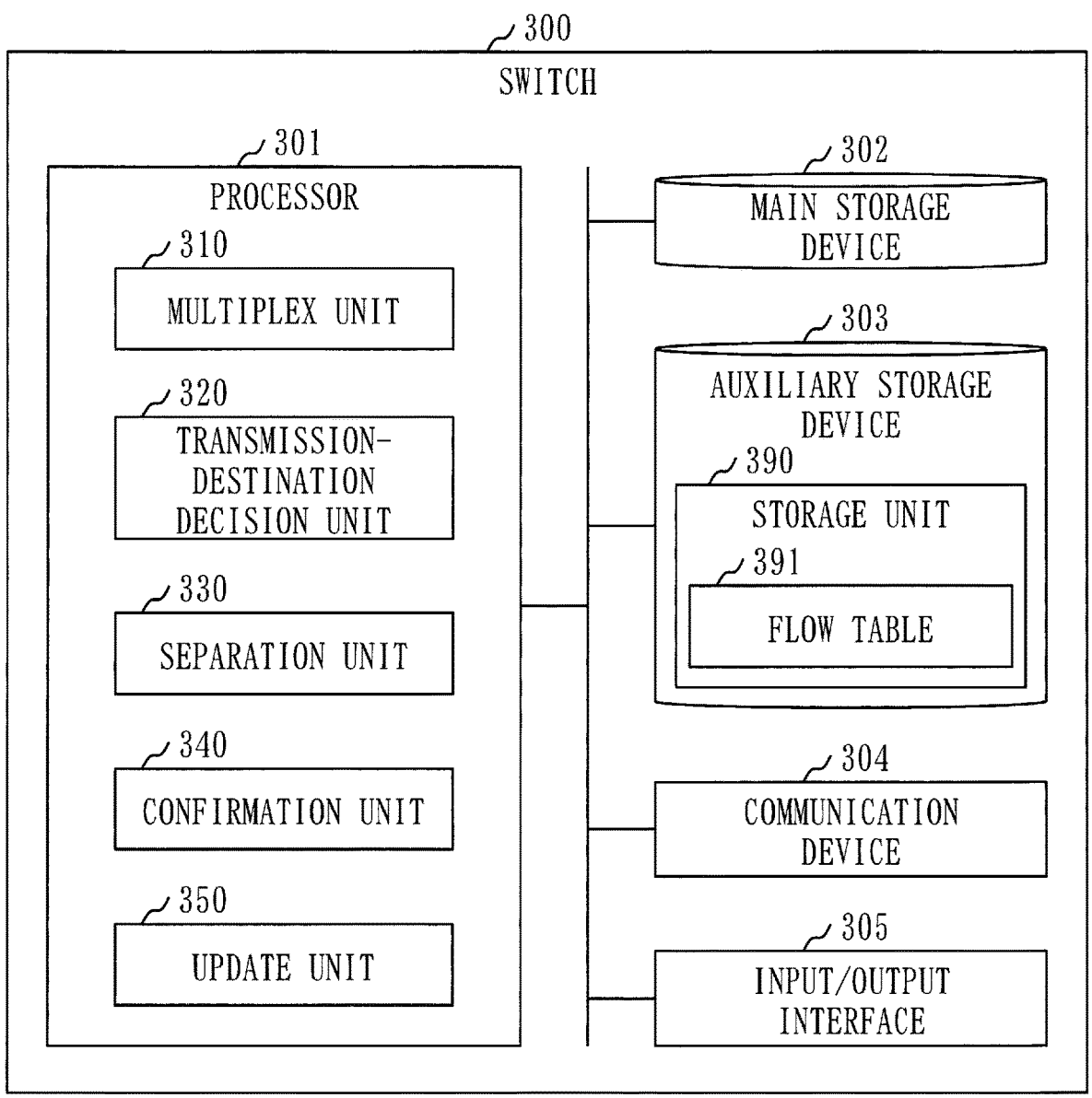
FIG. 8 is a configuration diagram of a switch 300 according to the first embodiment.

Based on FIG. 8, a configuration of the switch 300 will be described.

The switch 300 is a computer which includes pieces of hardware such as a processor 301, a main storage device 302, an auxiliary storage device 303, a communication device 304, and an input/output interface 305. These pieces of hardware are connected to each other via a signal line.

The processor 301 is an IC that performs a computation process, and controls other pieces of hardware. For example, the processor 301 is a CPU.

The main storage device 302 is a volatile or non-volatile storage device. The main storage device 302 is also referred to as a memory or a main memory. For example, the main storage device 302 is a RAM. Data stored in the main storage device 302 is stored in the auxiliary storage device 303 as necessary.

The auxiliary storage device 303 is a non-volatile storage device. For example, the auxiliary storage device 303 is a ROM, an HDD, or a Flash Memory. Data stored in the auxiliary storage device 303 is loaded into the main storage device 302 as necessary.

The communication devices 304 are a receiver and a transmitter. The communication device 304 has a plurality of communication ports. For example, the communication device 304 is a communication chip or an NIC.

The input/output interface 305 is a port to which an input device and an output device are connected.

The switch 300 includes elements such as a multiplex unit 310, a transmission-destination decision unit 320, a separation unit 330, a confirmation unit 340, and an update unit 350. These elements are realized by software.

The auxiliary storage device 303 stores a frame forwarding program for causing a computer to function as the multiplex unit 310, the transmission-destination decision unit 320, the separation unit 330, the confirmation unit 340, and the update unit 350. The frame forwarding program is loaded into the main storage device 302 and executed by the processor 301.

The auxiliary storage device 303 further stores an OS. At least a part of the OS is loaded into the main storage device 302 and executed by the processor 301.

The processor 301 executes the frame forwarding program while executing the OS.

Input/output data of the frame forwarding program is stored in a storage unit 390. For example, the storage unit 390 stores a flow table 391 and the like The auxiliary storage device 303 functions as the storage unit 390. However, storage devices such as the main storage device 302, a register in the processor 301, and a cash memory in the processor 301 may function as the storage unit 390 in place of the auxiliary storage device 303 or together with the auxiliary storage device 303.

The switch 300 may include a plurality of processors which substitute for the processor 301. The plurality of processors share functions of the processor 301.

The frame forwarding program can be recorded (stored) in a non-volatile recording medium such as an optical disc or a flash memory, in a computer-readable manner.

Figure 9:
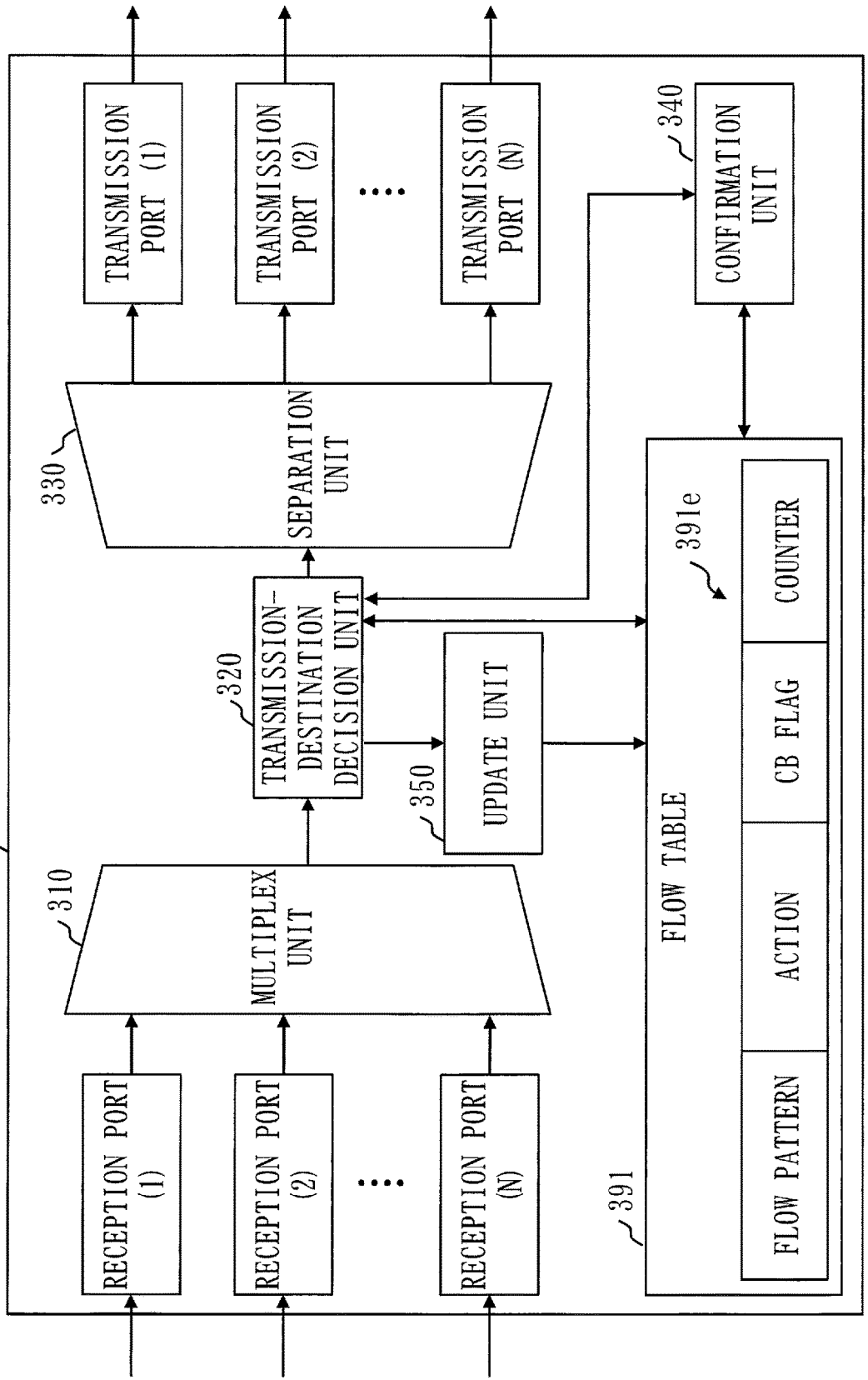
FIG. 9 is a functional block diagram of the switch 300 according to the first embodiment.

Based on FIG. 9, the descriptions of the configuration of the switch 300 will be continued.

The switch 300 includes a plurality of reception ports and a plurality of transmission ports.

Each reception port is a communication port for receiving the frame.

Each transmission port is a communication port for transmitting the frame.

The switch 300 has the flow table 391.

The flow table 391 has one or more flow entries 391e for the switch 300.

Details of the flow entry 391e are the same as the details of the flow entry for the switch 300 which is included in the flow table 281 managed in the controller 200.

Description of Operation

A procedure of operation (especially, operation of the controller 200) of the network system 100 is equivalent to a flow management method.

Figure 10:
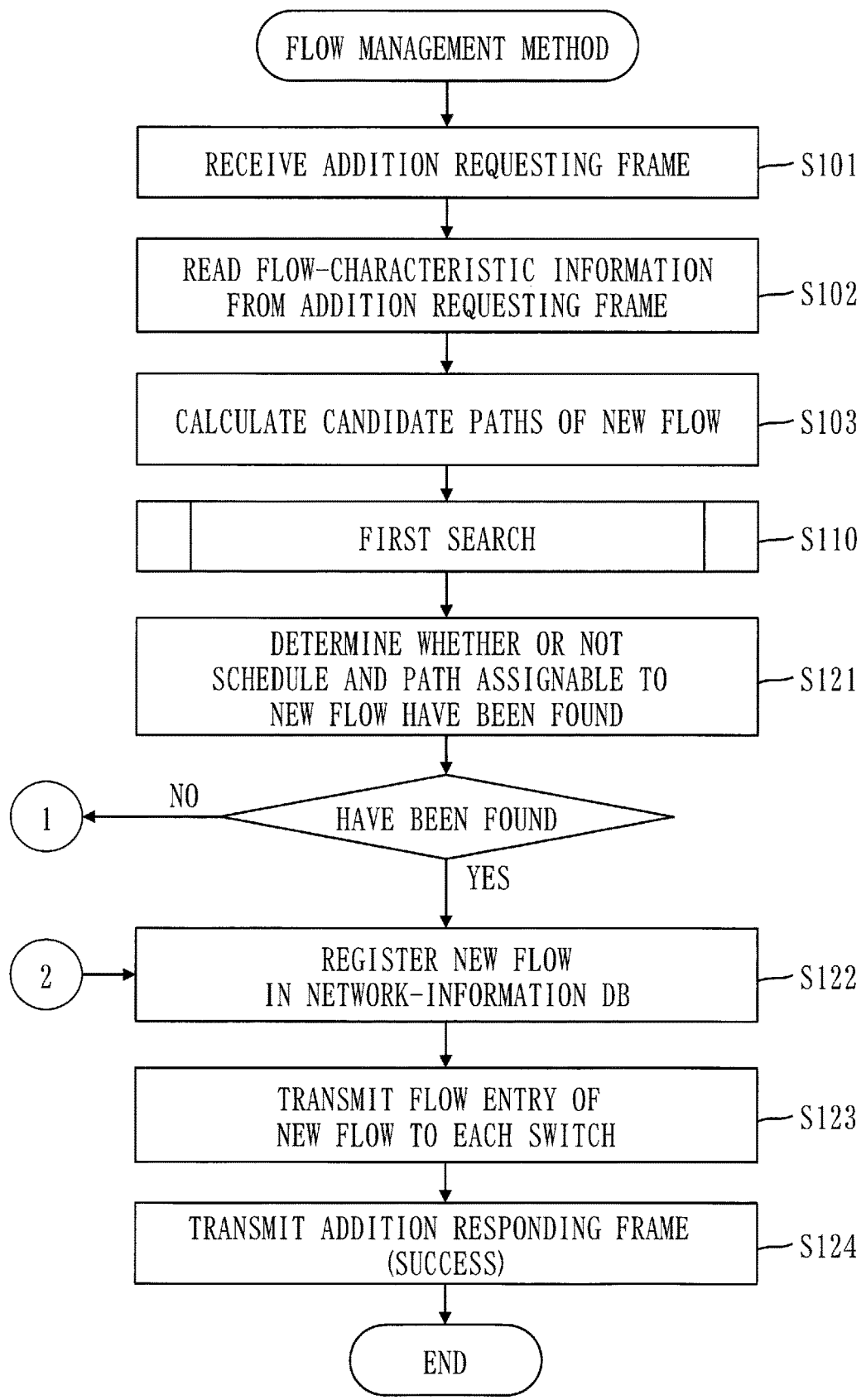
FIG. 10 is a flowchart of a flow management method according to the first embodiment.
Figure 11:
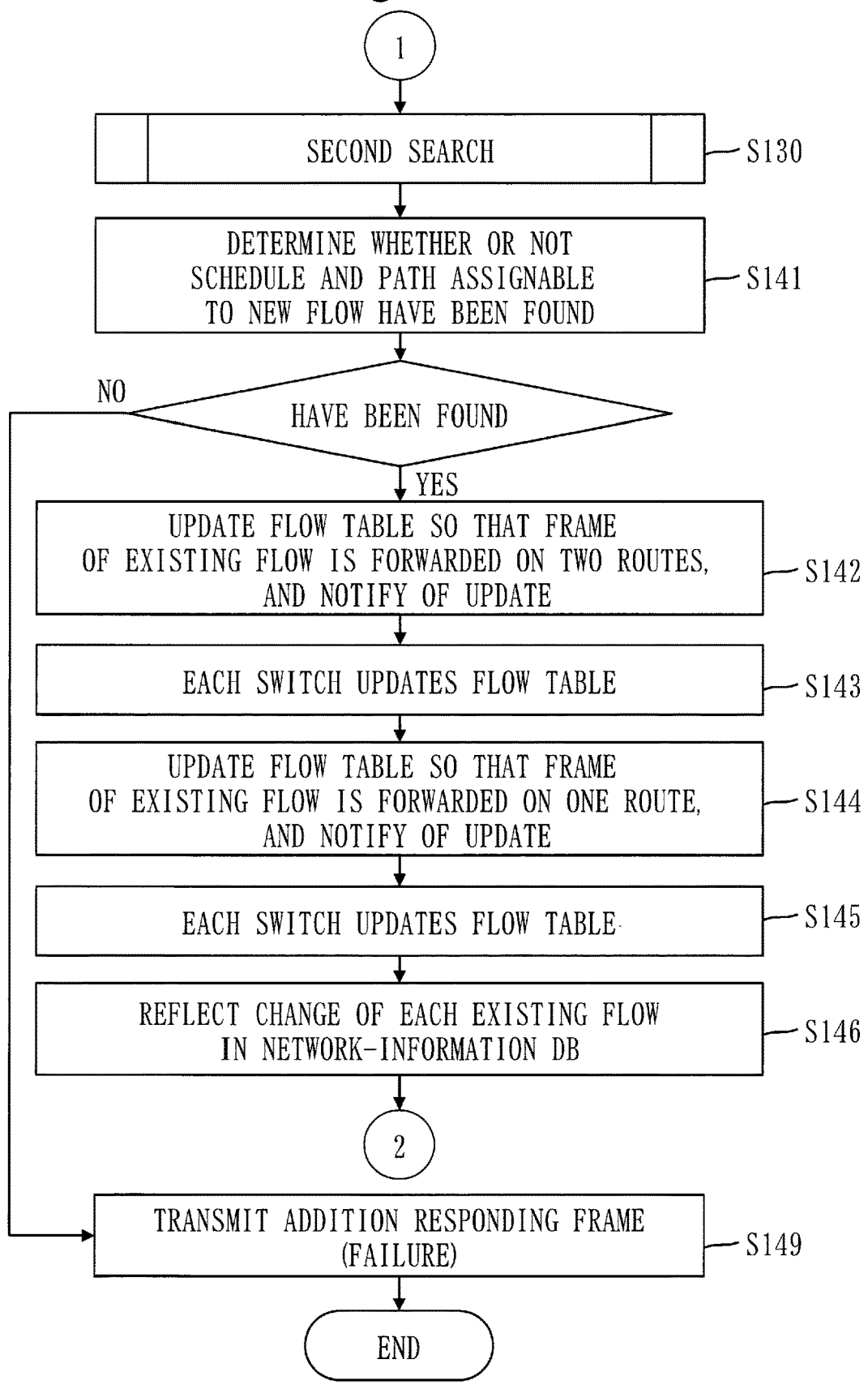
FIG. 11 is a flowchart of the flow management method according to the first embodiment.

Based on FIGS. 10 and 11, a procedure of the flow management method will be described.

In step S101, the reception unit 210 receives an addition requesting frame.

For example, one of the nodes 110 transmits the addition requesting frame to the controller 200, and in the controller 200, the reception unit 210 receives the addition requesting frame, using the communication device 204.

The addition requesting frame is a frame for requesting addition of a new communication flow.

The new communication flow is referred to as a "new flow".

In the addition requesting frame, flow-characteristic information on the new flow is set.

The flow-characteristic information includes parameters (a) to (h).

A parameter (a) identifies a transmission-origin node. The transmission-origin node is the node 110 which is a transmission origin of the frame.

The parameter (b) identifies a destination node. The destination node is the node 110 which is a destination of the frame.

A parameter (c) indicates the priority degree.

A parameter (d) indicates the acceptable delay. The acceptable delay is length of acceptable communication time.

A parameter (e) indicates the transmission cycle. The transmission cycle is a cycle in which the frame is transmitted.

A parameter (f) indicates the frame length. The frame length is a size of the frame.

A parameter (g) indicates the number of frames. The number of frames is the number of frames transmitted within the transmission cycle.

A parameter (h) indicates the gap between frames. The gap between the frames is a time interval between the frames.

Figure 12:
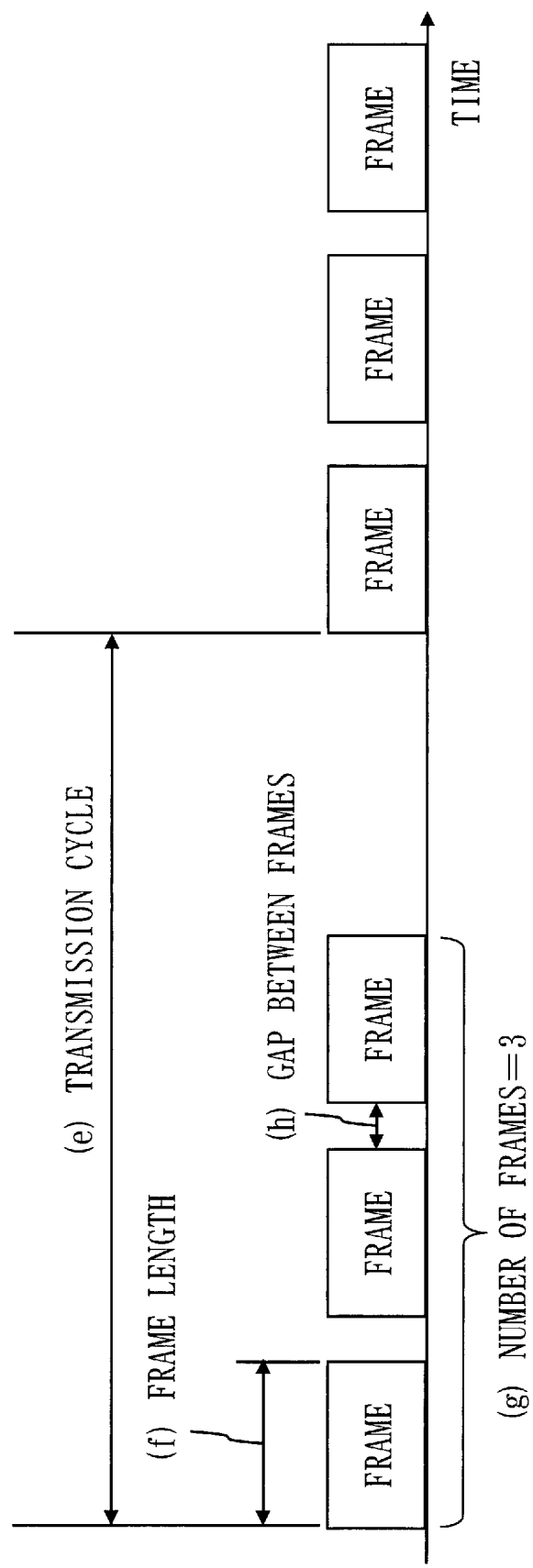
FIG. 12 is a relation diagram of parameters (e) to (h) according to the first embodiment.

FIG. 12 illustrates a relation between the parameters (e) to (h).

Returning to FIG. 10, the descriptions will be continued from step S102.

In step S102, the information extraction unit 220 reads the flow-characteristic information from the addition requesting frame. That is, the information extraction unit 220 reads the parameters (a) to (h) from the addition requesting frame.

In step S103, the candidate-paths calculation unit 230 calculates candidate paths of the new flow based on the parameter (a), the parameter (b), and the network configuration data 282.

The candidate paths are one or more candidate paths.

The candidate path is a candidate for a path from the transmission-origin node to the destination node. The candidate path does not form a loop.

The candidate paths can be calculated using well-known algorithm such as a Depth-first search.

Figure 13:
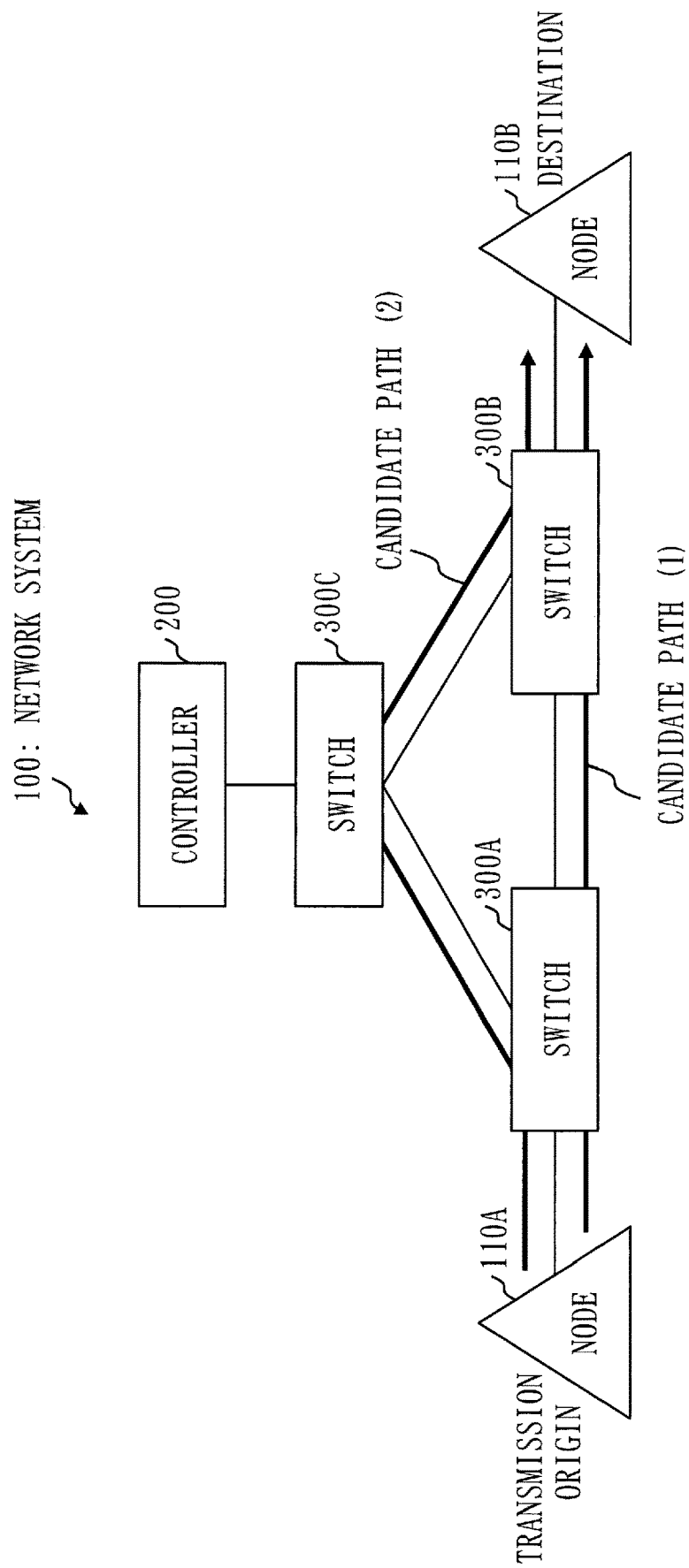
FIG. 13 is a diagram illustrating examples of candidate paths according to the first embodiment.

FIG. 13 illustrates specific examples of the candidate paths.

The transmission-origin node is a node 110A, and the destination node is a node 110B.

Two paths from the node 110A to the node 110B exist. That is, two candidate paths exist.

A candidate path (1) is a path of the node 110A→a switch 300A→a switch 300B→the node 110B.

A candidate path (2) is a path of the node 110A→the switch 300A→a switch 300C→the switch 300B→the node 110B.

Returning to FIG. 10, the descriptions will be continued from step S110.

In step S110, the first search unit 241 performs a first search based on the parameters (c) to (h) of the new flow, pieces of information on the candidate paths of the new flow, and the vacant-slot information in the time-slot data 284.

The first search is a process of searching for a schedule and a path assignable to the new flow without changing a schedule and a path of each existing flow.

The existing flow is a communication flow which already exists.

Details of the first search will be described later.

In step S121, the first search unit 241 determines whether or not the schedule and the path assignable to the new flow have been found.

If the schedule and the path assignable to the new flow have been found, the process proceeds to step S122.

If the schedule and the path assignable to the new flow have not been found, the process proceeds to step S130.

In step S122, the new-flow addition unit 251 registers the new flow in the network-information database 280.

The new flow is registered as below.

The new-flow addition unit 251 generates a flow entry of the new flow for each switch 300 existing on the path of the new flow and adds the generated flow entries to the flow table 281.

The new-flow addition unit 251 generates the pass information based on the path of the new flow and the used-slot information based on the schedule of the new flow. Then, the new-flow addition unit 251 adds to the flow-information data 283, the flow information 283i which includes the parameters (c) to (h), the path information, and the used-slot information.

The new-flow addition unit 251 generates the time-slot information 284i for each port of each switch 300 existing on the path of the new flow and adds the generated time-slot information 284i to the time-slot data 284.

The new-flow addition unit 251 adds the pieces of information on the candidate paths of the new flow to the candidate-paths data 285. Note that, in the candidate-paths data 285, pieces of information on candidate paths of the existing flow have been registered in advance.

In step S123, the new-flow addition unit 251 generates an addition notifying frame for each switch 300 existing on the path of the new flow and transmits the addition notifying frame to each switch 300 existing on the path of the new flow.

The addition notifying frame includes the flow entry of the new flow.

For example, the switch 300A exists on the path of the new flow. In this case, the new-flow addition unit 251 extracts flow entries for the switch 300A from the flow table 281 and selects the flow entry of the new flow from the extracted flow entries. Then, the new-flow addition unit 251 generates the addition notifying frame including the selected flow entry and transmits the generated addition notifying frame to the switch 300A.

Each addition notifying frame is transmitted according to, for example, a communication protocol used in the SDN generally.

Each switch 300 receives the addition notifying frame.

In the switch 300, the update unit 350 adds to the flow table 391, the entry of the new flow included in the addition notifying frame.

In step S124, the response unit 260 generates an addition responding frame (success) and transmits the addition responding frame (success) to a transmission origin of the addition requesting frame.

The addition responding frame (success) is a frame for responding to the addition requesting frame and includes addition success information. The addition success information indicates that the new flow has been added. Further, the addition responding frame (success) includes transmission-time-point information of the new flow. The transmission-time-point information on the new flow indicates a transmission time point of the frame on the schedule of the new flow.

After step S124, the process ends.

In step S130, the second search unit 242 performs a second search based on the parameters (a) to (f) of the new flow, the pieces of information on the candidate paths of the new flow, and the candidate-paths data 285.

The second search is a process of changing the schedule and the path of each existing flow and searching for the schedule and the path assignable to the new flow. In the second search, reinforcement learning is used.

Details of the second search will be described later.

In step S141, the second search unit 242 determines whether or not the schedule and the path assignable to the new flow have been found.

If the schedule and the path assignable to the new flow have been found, the process proceeds to step S142.

If the schedule and the path assignable to the new flow have not been found, the process proceeds to step S149.

In step S142, the existing-flow change unit 252 updates the flow table 281 so that the frame of each existing flow to be changed is forwarded on two routes which are a pre-change path and a post-change path. The update in step S142 is referred to as a "first update".

In other words, the flow table 281 is updated so that the frame of each existing flow to be changed is forwarded on the two routes based on the path redundancy method stipulated in IEEE 802.1CB.

Specifically, the existing-flow change unit 252 performs update processes (1) and (2).

The update process (1) is a process of adding the flow entry for each switch 300 which forwards the frame without reproducing on the post-change path of each existing flow. The flow entry is added, which is for forwarding the frame without reproducing on the post-change path of each existing flow. A flag value of the added flow entry is "1".

In FIG. 13, it is presumed that the candidate path (1) is the pre-change path and the candidate path (2) is the post-change path. In this case, the switches 300 which forward the frame without reproducing on the candidate path (2) which is the post-change path, are the switch 300C and the switch 300B. Then, a flow entry for the switch 300C to forward to the switch 300B, the frame forwarded from the switch 300A is added. Also, a flow entry for the switch 300B to forward to the node 110B, the frame forwarded from the switch 300C is added.

The update process (2) is a process of changing the flow entry for each switch 300 which reproduces the frame on the pre-change path of each existing flow and forwards the frame to each of the switch on the pre-change path and the switch on the post-change path. Each flow entry subject to the change is changed from the flow entry for forwarding the frame without reproducing on the pre-change path of the existing flow, to the flow entry for reproducing the frame and forwarding the frame on each of the pre-change path and the post-change path. A flag value of a post-change flow entry is "1".

In FIG. 13, it is presumed that the candidate path (1) is the pre-change path and the candidate path (2) is the post-change path. In this case, the switch 300 which reproduces the frame on the candidate path (1) which is the pre-change path, and forwards the frame to each of the switch 300B on the pre-change path and the switch 300C on the post-change path is the switch 300A. Then, the flow entry for the switch 300A is changed. A pre-change flow entry is a flow entry for forwarding the frame to the switch 300B without reproducing the frame received from the node 110A. A post-change flow entry is a flow entry for reproducing the frame received from the node 110A and forwarding the frame to each of the switch 300B and the switch 300C.

The existing-flow change unit 252 generates an update notifying frame including information on the flow entry for each of the added flow entry and the changed flow entry and transmits the generated update notifying frame to the switch 300 corresponding to the flow entry. That is, the update notifying frames are transmitted to each switch 300 existing on the pre-change path and each switch 300 existing on the post-change path.

Specifically, the existing-flow change unit 252 transmits the update notifying frame for each flow entry changed in the update process (2) after transmitting the update notifying frame for each flow entry added in the update process (1), according to a procedure of the SDN.

It is unnecessary to update the flow entry for each switch 300 which discards the frame of the existing flow to be changed.

A function of discarding the frame arriving later is realized by operation of IEEE802.1CB. It is unnecessary to set the flow entry for realizing the function of discarding the frame arriving later.

In step S143, each switch 300 which is a destination of the update notifying frame receives the update notifying frame.

In the switch 300, the update unit 350 updates the flow table 391 according to the information included in the update notifying frame. That is, the flow entry for the post-change existing flow is added, and the flow entry for the pre-change existing flow is changed.

After that, each switch 300 forwards each frame according to each flow entry in the updated flow table 391. Each frame is forwarded as below.

The multiplex unit 310 multiplexes the frame input from each reception port.

The transmission-destination decision unit 320 selects from the flow table 391, a flow entry in which a frame pattern corresponding to a pattern of each frame is set, and adds to the frame, a port identifier of a transmission port designated in the action of the selected flow entry. If the action is discarding of the frame or if the flow entry does not exist, the transmission-destination decision unit 320 discards the frame. If the frame is not discarded, the transmission-destination decision unit 320 adds 1 to the counter of the selected flow entry.

The separation unit 330 forwards each frame from the transmission port identified by the port identifier which has been added to the frame.

In a flow entry whose flag value is "1", that is, the flow entry for the pre-change existing flow or the flow entry for the post-change existing flow, if a counter value becomes a value equal to or larger than a threshold value, the confirmation unit 340 operates as below. The flow entry whose counter value has become the value equal to or larger than the threshold value is referred to as a "subject flow entry". The confirmation unit 340 generates a confirmation notifying frame including information on the subject flow entry and transmits the confirmation notifying frame to the controller 200. After that, the confirmation unit 340 changes a flag value of the subject flow entry to "0".

In step S144, the existing-flow change unit 252 receives the confirmation notifying frame. By receiving the confirmation notifying frame, it is confirmed that the frame of each existing flow to be changed has been forwarded on the two routes.

The existing-flow change unit 252 updates the flow table 281 based on the information included in the confirmation notifying frame so that the frame of the existing flow to be changed is forwarded on one route.

The update in step S144 is referred to as a "second update".

The flow table 281 is updated as below. The flow entry specified by the information included in the confirmation notifying frame is referred to as a "subject flow entry".

If the subject flow entry is the flow entry for the post-change existing flow, the subject flow entry is changed to the flow entry for forwarding the frame of the post-change existing flow without reproducing.

If the subject flow entry is the flow entry for the pre-change existing flow, the subject entry is deleted.

The flow table 281 is updated according to the confirmation notifying frame from each switch 300, and consequently, update processes (3) and (4) are realized.

The update process (3) is a process of changing the flow entry for each switch 300 which reproduces the frame on the pre-change path of each existing flow and forwards the frame to each of the switch on the pre-change path and the switch on the post-change path. Each flow entry subject to the change is changed to the flow entry for forwarding the frame without reproducing on the post-change path of the existing flow.

In FIG. 13, it is presumed that the candidate path (1) is the pre-change path and the candidate path (2) is the post-change path. In this case, the switch 300 which reproduces the frame on the candidate path (2) which is the post-change path, and forwards the frame to each of the switch 300B on the pre-change path and the switch 300C on the post-change path is the switch 300A. Then, the flow entry for the switch 300A is changed. The pre-change flow entry is a flow entry for reproducing the frame received from the node 110A and forwarding the frame to each of the switch 300B and the switch 300C. The post-change flow entry is a flow entry for forwarding the frame to the switch 300C without reproducing the frame received from the node 110A.

The update process (4) is a process of deleting the flow entry for each switch 300 which forwards the frame without reproducing on the pre-change path of each existing flow.

In FIG. 13, it is presumed that the candidate path (1) is the pre-change path and the candidate path (2) is the post-change path. In this case, the switch 300 which forwards the frame without reproducing on the candidate path (1) which is the pre-change path is the switch 300B. Then, the flow entry for the switch 300B to forward to the node 110B, the frame forwarded from the switch 300A, is deleted.

The existing-flow change unit 252 generates an update notifying frame including information on the flow entry for each of the changed flow entry and the deleted flow entry and transmits the generated update notifying frame to the switch 300 corresponding to the flow entry.

Specifically, the existing-flow change unit 252 transmits the update notifying frame for each flow entry deleted in the update process (4), after transmitting the update notifying frame for each flow entry changed in the update process (3), according to the procedure of the SDN.

It is unnecessary to update the flow entry for each switch 300 which discards the frame of the existing flow to be changed.

In step S145, each switch 300 which is a destination of the update notifying frame receives the update notifying frame.

In each switch 300, the update unit 350 updates the flow table 391 according to the information included in the update notifying frame. That is, the flow entry for the post-change existing flow is changed, and the flow entry for the pre-change existing flow is deleted.

After that, each switch 300 forwards each frame according to each flow entry in the updated flow table 391. A forwarding method is the same as the method in step S143.

In a flow entry whose flag value is "1", that is, the flow entry for the pre-change exiting flow or the flow entry for the post-change existing flow, if the counter value becomes a value equal to or larger than a threshold value, the confirmation unit 340 operates as below. The flow entry whose counter value has become the value equal to or larger than the threshold value is referred to as a "subject flow entry". The confirmation unit 340 generates a confirmation notifying frame including information on the subject flow entry and transmits the confirmation notifying frame to the controller 200. After that, the confirmation unit 340 changes a flag value of the subject flow entry to "0".

In steps S142 to S145, the change of each existing flow is reflected in the flow table 281.

In step S146, the existing-flow change unit 252 receives the confirmation notifying frame.

The existing-flow change unit 252 reflects the change of each existing flow in the network-information database 280 (excluding the flow table 281).

The change of each existing flow is reflected as below.

The existing-flow change unit 252 generates the path information based on the path of the post-change existing flow and generates the used-slot information based on the schedule of the post-change existing flow. Then, the existing-flow change unit 252 selects the flow information 283$i$ on the pre-change existing flow from the flow-information data 283 and updates the path information and the used-slot information in the selected flow information 283$i$ to the path information and the used-slot information which have been generated.

The existing-flow change unit 252 deletes from the time-slot data 284, the time-slot information 284$i$ for each port of each switch 300 existing on the path of the pre-change existing flow. Further, the existing-flow change unit 252 generates the time-slot information 284i for each port of each switch 300 existing on the path of the post-change existing flow and adds the generated pieces of time-slot information 284i to the time-slot data 284.

After step S146, the process proceeds to step S122.

In step S149, the response unit 260 generates an addition responding frame (failure) and transmits the addition responding frame (failure) to the transmission origin of the addition requesting frame.

The addition responding frame (failure) is a frame for responding to the addition requesting frame and includes addition failure information. The addition failure information indicates that the new flow has not been added.

After step S149, the process ends.

Figure 14:
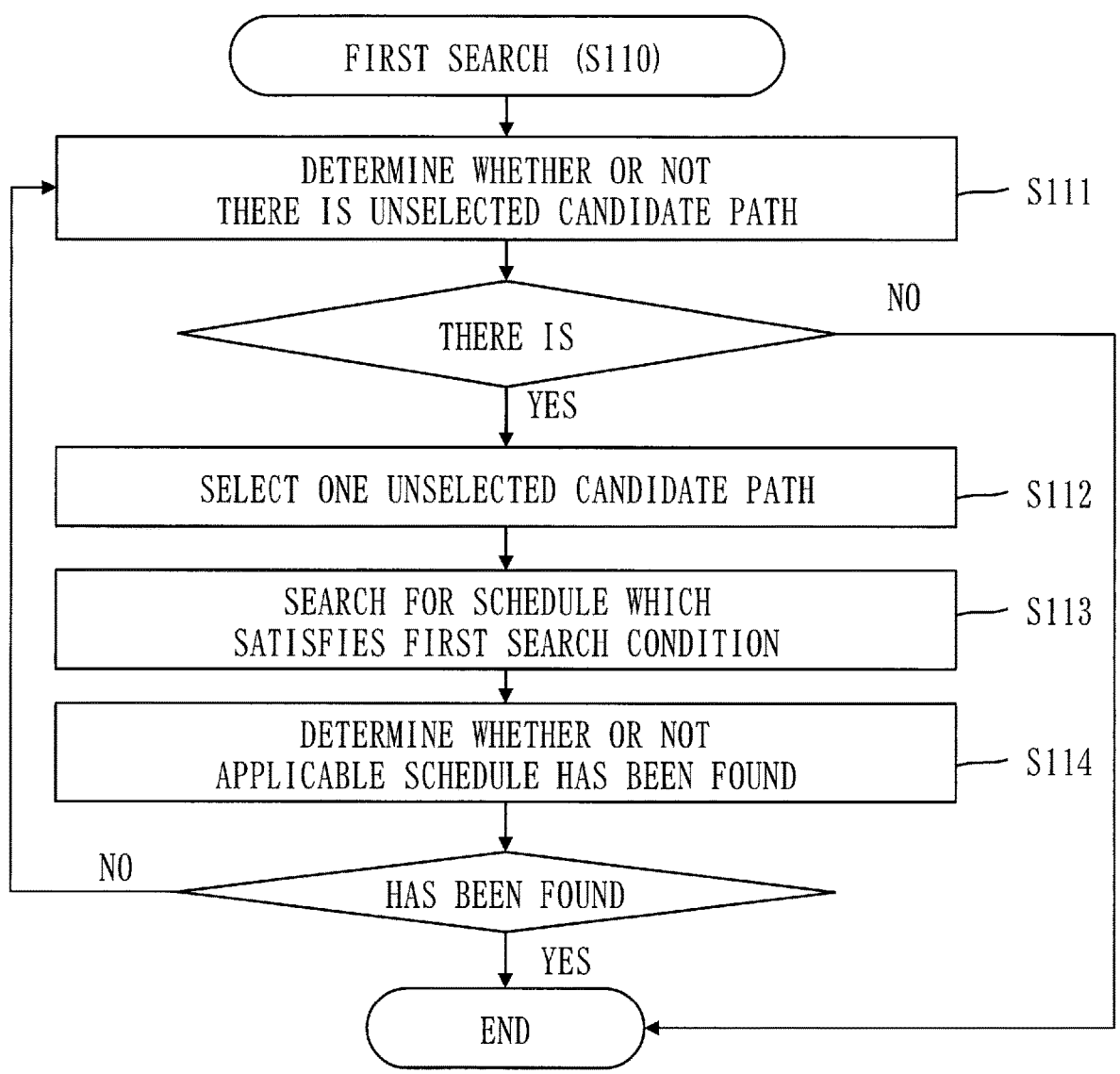
FIG. 14 is a flowchart of a first search (S110) according to the first embodiment.

Based on FIG. 14, a procedure of the first search (S110) will be described.

In step S111, the first search unit 241 determines whether or not there is an unselected candidate path in the candidate paths of the new flow.

If there is the unselected candidate path, the process proceeds to step S112.

If there is no unselected candidate path, the schedule and the path assignable to the new flow have not been found, and the process ends.

In step S112, the first search unit 241 selects one unselected candidate path from the candidate paths of the new flow.

For example, the first search unit 241 selects the candidate path in ascending order of the number of switches 300 through which the frame passes.

The candidate path selected in step S112 is referred to as a "subject path".

In step S113, the first search unit 241 searches for a schedule (an applicable schedule), which satisfies a first search condition, of the new flow.

The first search condition includes [condition 1] and [condition 2]. When both [condition 1] and [condition 2] are satisfied, the first search condition is satisfied.

[condition 1] is a condition that each switch 300 existing on the subject path has a vacant slot whose length of time is equal to or longer than forwarding time for the frame of the new flow. The forwarding time for the frame is time required to forward the frame.

The vacant slot whose length of time is equal to or longer than the forwarding time for the frame of the new flow is referred to as an "applicable slot".

[condition 2] is a condition that when each switch 300 existing on the subject path forwards the frame of the new flow in the applicable slot, a length of communication time required for communication in the new flow does not exceeds the acceptable delay of the new flow. The length of communication time is a length of time from the transmission of the frame by the transmission-origin node until the reception of the frame by the destination node. The acceptable delay of the new flow is indicated in the parameter (d).

The search for the applicable schedule can be performed using a general-purpose solver such as an SAT solver.

In step S114, the first search unit 241 determines whether or not the applicable schedule has been found.

If the applicable schedule has been found, the applicable schedule and the subject path have been found as the schedule and the path assignable to the new flow, and the process ends.

If the applicable schedule has not been found, the process proceeds to step S111.

Figure 15:
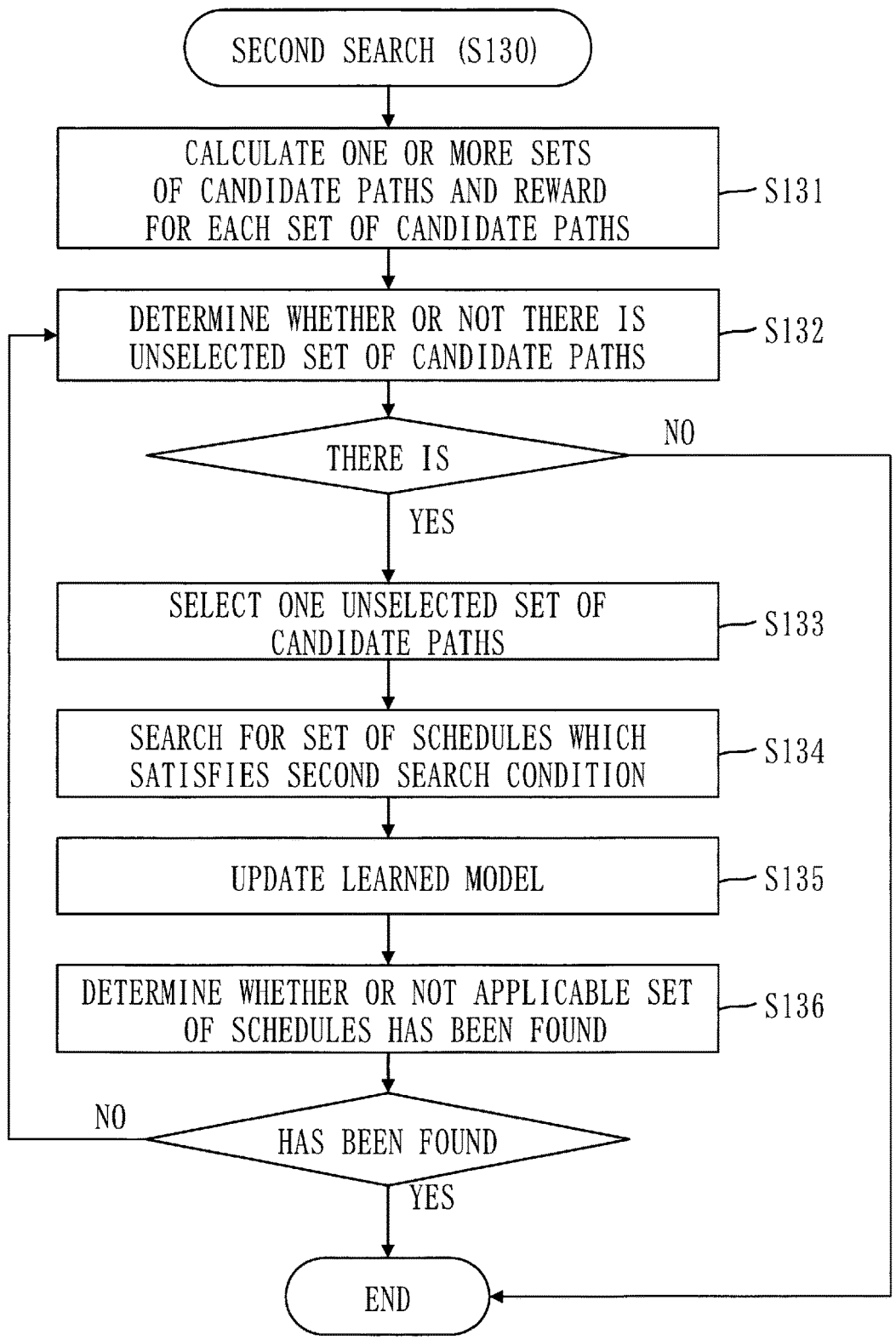
FIG. 15 is a flowchart of a second search (S130) according to the first embodiment.

Based on FIG. 15, a procedure of the second search (S130) will be described.

In step S131, the inference unit 242A calculates one or more sets of candidate paths and a reward for each set of candidate paths.

The set of candidate paths is a set of the candidate path of the new flow and the candidate path of the existing flow.

For example, if an existing flow (1) and an existing flow (2) exist, the set of candidate paths is a set of the candidate path of the new flow, a candidate path of the existing flow (1), and a candidate path of the existing flow (2).

The reward for the set of candidate paths indicates value of the set of candidate paths.

In a case where the set of candidate paths is used as the set of the path of the new flow and the path of the existing flow, the longer the spare time for the acceptable delay of the new flow and the spare time for the acceptable delay of each existing flow are, the higher the reward for the set of candidate paths is.

The spare time for the acceptable delay is a difference between the acceptable delay and the communication time. In other words, the spare time for the acceptable delay is time calculated by subtracting the communication time from the acceptable delay.

For example, the reward for the set of candidate paths is defined as below.

reward=schedule existing flag*total spare time

The schedule existing flag indicates whether or not a schedule exists. If the schedule exists, the schedule existing flag is "1". If the schedule does not exist, the schedule existing flag is "0".

The total spare time is a total of the spare time for the acceptable delay of the new flow and the spare time for the acceptable delay of each existing flow.

Specifically, the inference unit 242A computes the learned model 291, treating as input, the parameters (a) to (f) of the new flow, the pieces of information on the candidate paths of the new flow, and the candidate-paths data 285.

The candidate-paths data 285 includes the pieces of information on the candidate paths of each existing flow.

The learned model 291 is a learned model generated by reinforcement learning.

The learned model 291 is computed, and thereby, the one or more sets of candidate paths and the reward for each set of candidate paths are calculated.

The one or more sets of candidate paths calculated in step S131 are referred to as "sets of candidate paths".

In step S132, the set-of-paths selection unit 242B determines whether or not there is an unselected set of candidate paths in the sets of candidate paths.

If there is the unselected set of candidate paths, the process proceeds to step S133.

If there is no unselected set of candidate paths, the schedule and the path assignable to the new flow and the schedule and the path assignable to the existing flow have not been found, and the process ends.

In step S133, the set-of-paths selection unit 242B selects one unselected set of candidate paths from the sets of candidate paths. Specifically, the set-of-paths selection unit 242B selects the unselected set of candidate paths in descending order of the reward.

The selected set of candidate paths is referred to as a "subject set of paths".

In step S134, when the subject set of paths is the set of the path of the new flow and the path of the existing flow, the set-of-schedules search unit 242C searches for a set of schedules (an applicable set of schedules) which satisfies a second search condition.

The set of schedules is a set of the schedule of the new flow and the schedule of the existing flow.

For example, if an existing flow (1) and an existing flow (2) exist, the set of schedules is a set of the schedule of the new flow, a schedule of the existing flow (1), and a schedule of the existing flow (2).

The second search condition includes [condition 1], [condition 2], and [condition 3]. When all of [condition 1], [condition 2], and [condition 3] are satisfied, the second search condition is satisfied.

[condition 1] and [condition 2] are the same as those in the first search condition.

[condition 3] is a condition that a time point for transmitting the frame is not changed in each existing flow. That is, [condition 3] is a condition that a time point when the frame is transmitted from the transmission-origin node is not changed in each existing flow.

The search for the applicable schedule can be performed using a general-purpose solver such as an SAT solver.

In step S135, the learning unit 242D updates the learned model 291.

Specifically, the learning unit 242D performs reinforcement learning on the learned model 291, treating the subject set of paths and the reward for the subject set of paths as input. Thereby, the learned model 291 is updated.

In step S136, the set-of-paths selection unit 242B determines whether or not the applicable set of schedules has been found.

If the applicable set of schedules has been found, the applicable set of schedules has been found as the set of the schedule assignable to the new flow and the schedule assignable to the existing flow, the subject set of paths has been found as the set of the path assignable to the new flow and the path assignable to the existing flow, and the process ends.

If the applicable set of schedules has not been found, the process proceeds to step S132.

Effect of First Embodiment

It is possible to flexibly manage a TSN network, by searching for the schedule and the path of the new flow while taking the change of the path of the existing flow into consideration.

That is, it is possible to add the new communication flow in a situation that the new communication flow can be added if the existing communication flow is changed.

Supplement to Embodiment

Figure 16:
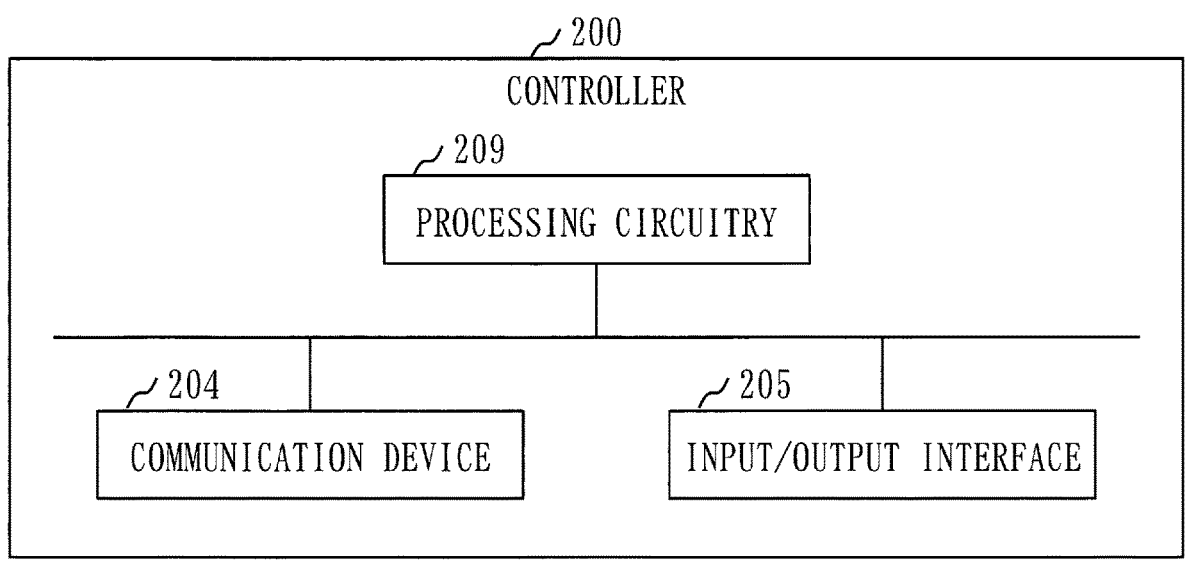
FIG. 16 is a hardware configuration diagram of the controller 200 according to the first embodiment.

Based on FIG. 16, a hardware configuration of the controller 200 will be described.

The controller 200 includes processing circuitry 209.

The processing circuitry 209 is hardware that realizes the reception unit 210, the information extraction unit 220, the candidate-paths calculation unit 230, the search unit 240, the flow management unit 250, and the response unit 260.

The processing circuitry 209 may be dedicated hardware or the processor 201 that executes a program stored in the main storage device 202.

When the processing circuitry 209 is the dedicated hardware, the processing circuitry 209 is, for example, a single circuit, a composite circuit, a programmed processor, a parallel-programmed processor, an ASIC, an FPGA, or a combination of these.

ASIC stands for Application Specific Integrated Circuit.
FPGA stands for Field Programmable Gate Array.

The controller 200 may include a plurality of pieces of processing circuitry that substitute for the processing circuitry 209. The plurality of pieces of processing circuitry share functions of the processing circuitry 209.

In the processing circuitry 209, a part of the functions may be realized by the dedicated hardware, and the rest of the functions may be realized by software or firmware.

In this way, the function of the controller 200 can be realized by hardware, software, firmware, or a combination of these.

Figure 17:
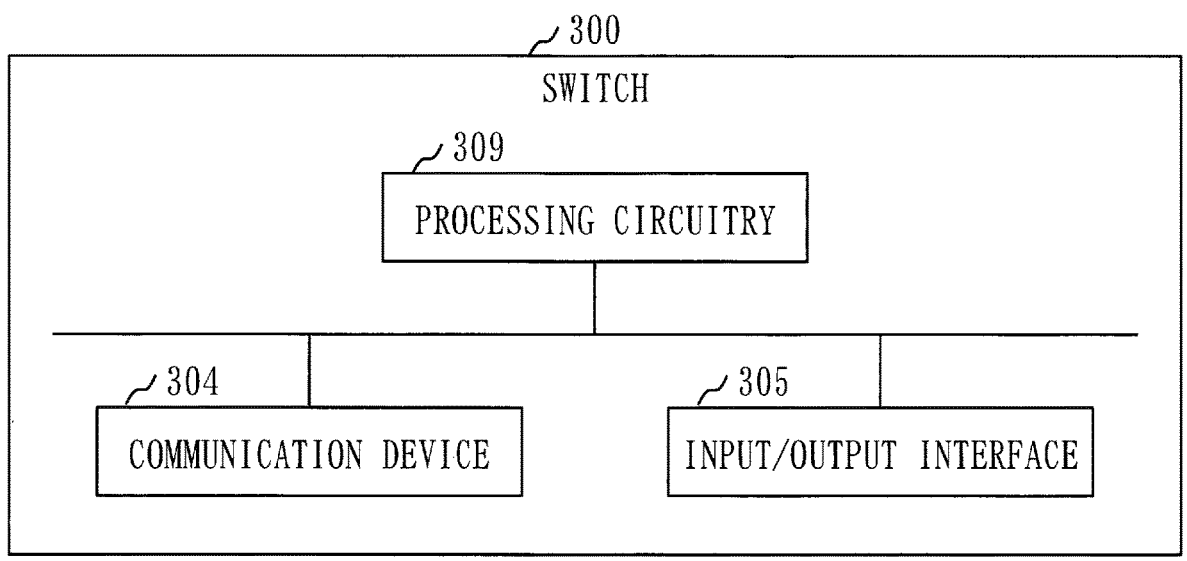
FIG. 17 is a hardware configuration diagram of the switch 300 according to the first embodiment.

Based on FIG. 17, a hardware configuration of the switch 300 will be described.

The switch 300 includes processing circuitry 309.

The processing circuitry 309 is hardware that realizes the multiplex unit 310, the transmission-destination decision unit 320, the separation unit 330, the confirmation unit 340, and the update unit 350.

The processing circuitry 309 may be dedicated hardware or the processor 301 that executes a program stored in the main storage device 302.

When the processing circuitry 309 is the dedicated hardware, the processing circuitry 309 is, for example, a single circuit, a composite circuit, a programmed processor, a parallel-programmed processor, an ASIC, an FPGA, or a combination of these.

The switch 300 may include a plurality of pieces of processing circuitry that substitute for the processing circuitry 309. The plurality of pieces of processing circuitry share functions of the processing circuitry 309.

In the processing circuitry 309, a part of the functions may be realized by the dedicated hardware, and the rest of the functions may be realized by software or firmware.

In this way, the function of the switch 300 can be realized by hardware, software, firmware, or a combination of these.

Each embodiment is an example of a preferred embodiment and is not intended to limit the technical scope of the present disclosure. Each embodiment may be implemented partially or implemented being combined with the other embodiment. The procedures described using the flowcharts and the like may be modified as necessary.

"unit" which is an element of each of the controller 200 and the switch 300 may be replaced by "process" or "step".

REFERENCE SIGNS LIST

100: network system, 110: node, 200: controller, 201: processor, 202: main storage device, 203: auxiliary storage device, 204: communication device, 205: input/output interface, 209: processing circuitry, 210: reception unit, 220: information extraction unit, 230: candidate-paths calculation unit, 240: search unit, 241: first search unit, 242: second search unit, 242A: inference unit, 242B: set-of-paths selection unit, 242C: set-of-schedules search unit, 242D: learning unit, 250: flow management unit, 251: new-flow addition unit, 252: existing-flow change unit, 260: response unit, 280: network-information database, 281: flow table, 282: network configuration data, 283: flow-information data, 283i: flow information, 284: time-slot data, 284i: time-slot information, 285: candidate-paths data, 290: storage unit, 291: learned model, 300: switch, 301: processor, 302: main storage device, 303: auxiliary storage device, 304: communication device, 305: input/output interface, 309: processing circuitry, 310: multiplex unit, 320: transmission-destination decision unit, 330: separation unit, 340: confirmation unit, 350: update unit, 390: storage unit, 391: flow table, 391e: flow entry.

The invention claimed is:

1. A controller comprising:
processing circuitry
to receive an addition requesting frame for requesting addition of a new flow which is a new communication flow;
to perform, using a network-information database in which a schedule and a path of each existing flow which is an existing communication flow are registered, a first search for searching for a schedule and a path assignable to the new flow without the schedule and the path of each existing flow being changed, when the addition requesting frame is received;
to perform a second search for changing the schedule and the path of each existing flow and searching for the schedule and the path assignable to the new flow, using the network-information database, when the schedule and the path assignable to the new flow have not been found by the first search; and
to transmit an addition responding frame for responding to the addition requesting frame.

2. The controller according to claim 1,
wherein the processing circuitry
registers the new flow in the network-information database when the schedule and the path assignable to the new flow have been found by the first search or the second search, and
reflects a change of each existing flow in the network-information database when the schedule and the path assignable to the new flow have been found by the second search.

3. The controller according to claim 2,
wherein the processing circuitry
performs a first update for updating the network-information database so that a frame of each existing flow to be changed is forwarded on two routes which are a pre-change path and a post-change path,
transmits an update notifying frame including information on the first update to each switch existing on the pre-change path and each switch existing on the post-change path,
receives from each switch, a confirmation notifying frame for confirming that the frame of each existing flow to be changed has been forwarded on the two routes,
performs a second update for updating the network-information database so that the frame of each existing flow to be changed is forwarded on one route which is the post-change path, and
transmits an update notifying frame including information on the second update to each switch existing on the pre-change path and each switch existing on the post-change path.

4. A network system comprising: a controller which manages a communication flow; and a plurality of switches which forward a frame of each communication flow,
wherein the controller comprises:
processing circuitry
to receive an addition requesting frame for requesting addition of a new flow which is a new communication flow;
to perform, using a network-information database in which a schedule and a path of each existing flow which is an existing communication flow are registered, a first search for searching for a schedule and a path assignable to the new flow without the schedule and the path of each existing flow being changed, when the addition requesting frame is received;
to perform a second search for changing the schedule and the path of each existing flow and searching for the schedule and the path assignable to the new flow, using the network-information database, when the schedule and the path assignable to the new flow have not been found by the first search; and
to transmit an addition responding frame for responding to the addition requesting frame.

5. A flow management method comprising:
receiving an addition requesting frame for requesting addition of a new flow which is a new communication flow;
performing, using a network-information database in which a schedule and a path of each existing flow which is an existing communication flow are registered, a first search for searching for a schedule and a path assignable to the new flow without the schedule and the path of each existing flow being changed, when the addition requesting frame is received;
performing a second search for changing the schedule and the path of each existing flow and searching for the schedule and the path assignable to the new flow, using the network-information database, when the schedule and the path assignable to the new flow have not been found by the first search; and
transmitting an addition responding frame for responding to the addition requesting frame.

\* \* \* \* \*